United States Patent
Nishio et al.

(10) Patent No.: US 9,212,589 B2
(45) Date of Patent: Dec. 15, 2015

(54) HONEYCOMB FILTER

(71) Applicant: NGK INSULATORS, LTD., Nagoya (JP)

(72) Inventors: Akifumi Nishio, Nagoya (JP); Takahiro Kondo, Nagoya (JP); Yukio Miyairi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 105 days.

(21) Appl. No.: 14/026,328

(22) Filed: Sep. 13, 2013

(65) Prior Publication Data

US 2014/0093436 A1     Apr. 3, 2014

(30) Foreign Application Priority Data

Sep. 28, 2012 (JP) ................................. 2012-216587

(51) Int. Cl.
| | |
|---|---|
| *B01D 39/14* | (2006.01) |
| *B01D 39/06* | (2006.01) |
| *B01D 39/20* | (2006.01) |
| *B01D 24/00* | (2006.01) |
| *B01D 50/00* | (2006.01) |
| *F01N 3/28* | (2006.01) |
| *F01N 3/022* | (2006.01) |

(Continued)

(52) U.S. Cl.
CPC .......... *F01N 3/2828* (2013.01); *B01D 46/2466* (2013.01); *F01N 3/021* (2013.01); *F01N 3/0222* (2013.01); *B01D 2046/2496* (2013.01); *F01N 2330/06* (2013.01); *F01N 2330/60* (2013.01); *F01N 2450/28* (2013.01)

(58) Field of Classification Search
CPC ............ C04B 38/0016; F01N 2450/28; B01D 46/2466; B01D 46/2448
USPC .......................................................... 55/523
See application file for complete search history.

(56) References Cited

U.S. PATENT DOCUMENTS

| | | | | |
|---|---|---|---|---|
| 7,531,231 | B2 * | 5/2009 | Okumura et al. | 428/116 |
| 7,892,623 | B2 * | 2/2011 | Ohno et al. | 428/116 |
| 8,236,404 | B2 * | 8/2012 | Mizutani | 428/116 |

(Continued)

FOREIGN PATENT DOCUMENTS

| | | | |
|---|---|---|---|
| EP | 1 291 061 | A1 | 3/2003 |
| EP | 1 726 800 | A1 | 11/2006 |

(Continued)

OTHER PUBLICATIONS

Extended European Search Report (13186487.8) dated Dec. 17, 2013.

*Primary Examiner* — Amber Orlando
(74) *Attorney, Agent, or Firm* — Burr & Brown, PLLC

(57) ABSTRACT

A honeycomb filter 100 includes honeycomb segments 4, plugging portions 5, and joining layers 7, area of outflow end surface 12 of honeycomb segment is larger than area of inflow end surface 11, and shape of cross section of honeycomb segment vertical to axial direction X has a similarity in axial direction X. Moreover, thickness of joining layer decreases in at least a part of joining layer in direction from inflow end surface side toward outflow end surface side, and length L2 of joining layer in axial direction X is smaller than 95% of length L1 of honeycomb segment in axial direction X. Furthermore, a region of honeycomb segments 4, 5 mm or more from outflow end surface 12 in axial direction X, is not provided with joining layers 7 which join side surfaces of honeycomb segments 4 to each other.

13 Claims, 6 Drawing Sheets

(51) Int. Cl.
*F01N 3/021* (2006.01)
*B01D 46/24* (2006.01)

(56) References Cited

U.S. PATENT DOCUMENTS

| | | | |
|---|---|---|---|
| 2003/0053940 A1* | 3/2003 | Harada et al. | 422/180 |
| 2003/0138596 A1* | 7/2003 | Harada et al. | 428/116 |
| 2005/0178098 A1* | 8/2005 | Ono et al. | 55/523 |
| 2008/0014405 A1* | 1/2008 | Sakamoto | 428/116 |
| 2008/0034744 A1* | 2/2008 | Bardon et al. | 60/324 |
| 2008/0190081 A1* | 8/2008 | Oshimi | 55/385.3 |
| 2009/0246455 A1* | 10/2009 | Mizutani | 428/116 |

FOREIGN PATENT DOCUMENTS

| | | |
|---|---|---|
| EP | 2 127 719 A1 | 12/2009 |
| JP | 2002-253916 A1 | 9/2002 |

* cited by examiner

HONEYCOMB FILTER

The present application is an application based on JP-2012-216587 filed on Sep. 28, 2012 with the Japanese Patent Office, the entire contents of which are incorporated herein by reference.

BACKGROUND OF THE INVENTION

1. Field of the Invention

The present invention relates to a honeycomb filter, and more particularly, it relates to a honeycomb filter capable of suitably collecting a particulate matter included in an exhaust gas.

2. Description of Related Art

A diesel engine is advantageous as an engine for a car which has a better heat efficiency than a gasoline engine and which matches a demand for a decrease of carbon dioxide emissions as a global warming countermeasure. On the other hand, the diesel engine discharges an exhaust gas including a large amount of particulate matter by diffusion burning.

It has been pointed out that the particulate matter in the exhaust gas affects environments and human bodies, and measures to prevent the particulate matter in the exhaust gas from being discharged to the atmospheric air have been required. Heretofore, the amount of the particulate matter in the exhaust gas which is to be discharged from the diesel engine has been regulated in accordance with a mass ratio of the particulate matter in the exhaust gas. Moreover, in recent years, in addition to the above-mentioned regulation in accordance with the mass ratio of the particulate matter, a stricter exhaust gas regulation has been performed on the number of particulates in the exhaust gas which is an object to be regulated.

An example of a method of decreasing a mass of the particulate matter or the number of the particulates in the exhaust gas discharged from the diesel engine is a method of improving the burning in the diesel engine. However, in such a method by the improvement of the burning, there is a limit to the decrease of the mass of the particulate matter or the number of the particulates. Therefore, it is considered that a method of disposing a filter in an exhaust system of the diesel engine to collect the particulate matter in the exhaust gas by this filter is an effective method for decreasing the mass of the particulate matter or the number of the particulates in the exhaust gas.

An example of the filter to collect the particulate matter in the exhaust gas is a wall flow type filter including porous partition walls. In such a wall flow type filter, the exhaust gas permeates the porous partition walls, and the particulate matter in the exhaust gas is collected by the porous partition walls.

In this wall flow type filter, for the purpose of decreasing a pressure loss, it is necessary to lower a filtration speed. Therefore, in recent years, as the filter to collect the particulate matter in the exhaust gas, there has broadly been used a honeycomb filter using a honeycomb structure including a plurality of cells defined by porous partition walls. In this honeycomb filter, among the cells formed in the honeycomb structure, open frontal areas of the predetermined cells in one end surface, and open frontal areas of the remaining cells in the other end surface are plugged by plugging portions. The honeycomb filter has the honeycomb structure including the plurality of cells defined by the partition walls, and hence a filtering area through which the exhaust gas passes can be increased.

When a particulate matter such as soot in the exhaust gas is collected by the honeycomb filter, the collected particulate matter is deposited on the partition walls. When the particulate matter is continuously collected by the honeycomb filter, the pressure loss of the honeycomb filter increases due to the particulate matter deposited on the partition walls. For decreasing the pressure loss of the honeycomb filter, it is necessary to forcibly burn and remove the particulate matter by applying a high temperature gas to the particulate matter deposited on the partition walls. The burning and removing of the particulate matter will be referred to as the regeneration of the filter sometimes.

At the regeneration of the filter, a heat stress is generated in the filter by heat of the burning of a particulate matter such as the soot, and the generated heat stress causes damage to the filter which is being regenerated, sometimes. To prevent the filter from being damaged by the heat stress, there has been suggested a technology in which a plurality of honeycomb segments are prepared, and the plurality of honeycomb segments are joined to manufacture a honeycomb filter (see, e.g., Patent Document 1). In the honeycomb filter disclosed in Patent Document 1, the plurality of honeycomb segments are joined by an easily deformable joining material having a small elastic modulus. Hereinafter, the honeycomb filter manufactured by joining the plurality of honeycomb segments will be referred to as "the honeycomb filter of a segment structure" sometimes.

[Patent Document 1] JP-A-2002-253916

SUMMARY OF THE INVENTION

A honeycomb filter of a segment structure can decrease a heat stress generated in portions of the filter as compared with a honeycomb filter manufactured by using one honeycomb structure. However, in a cross section of the honeycomb filter of the segment structure which is vertical to a flow direction of an exhaust gas, however, an area of through channels through which the exhaust gas passes decreases as much as a thickness of a joining material which joins honeycomb segments. Therefore, with the decrease of the through channel area, a flow rate of the exhaust gas increases, which has caused the problem that a pressure loss of the honeycomb filter increases.

When the exhaust gas discharged from an engine is purified by the honeycomb filter, a temperature of the honeycomb filter on an outflow end surface side is high. Therefore, the heat stress generated in the honeycomb filter is maximized on the outflow end surface side. In the conventional honeycomb filter of the segment structure, the heat stress generated in the honeycomb filter can be alleviated to a certain degree by the joining material. However, the above-mentioned large heat stress generated on the outflow end surface side cannot sufficiently be decreased even by the conventional honeycomb filter of the segment structure, and further improvement has been required. That is, even when the easily deformable joining material having a small elastic modulus is used as disclosed in Patent Document 1, unrestricted deformation between the honeycomb segments is not completely acquired, and when a large heat stress is generated, it has been difficult to sufficiently decrease the heat stress.

The present invention has been developed in view of the above-mentioned problems, and an object thereof is to provide a honeycomb filter capable of suitably collecting a particulate matter included in an exhaust gas. In particular, there is provided a honeycomb filter which can suppress an increase of a pressure loss, and suitably decrease a heat stress generated in the honeycomb filter, as compared with a conventional honeycomb filter of a segment structure.

According to the present invention, a honeycomb filter is provided as follows.

[1] A honeycomb filter comprising: a plurality of honeycomb segments having partition walls with which a plurality of cells extending from an inflow end surface to an outflow end surface are formed to become through channels of a fluid; a plurality of plugging portions to plug open frontal areas of first cells on an inflow end surface side among the cells formed in the honeycomb segments, and open frontal areas of second cells other than the first cells on an outflow end surface side; and joining layers which partially join side surfaces of the plurality of honeycomb segments to each other, wherein an area of the outflow end surface of each of the honeycomb segments is larger than an area of the inflow end surface of the honeycomb segment, a shape of a cross section of the honeycomb segment which is vertical to an axial direction from the inflow end surface toward the outflow end surface has a similarity in the axial direction, a thickness of each of the joining layers which join the side surfaces of the honeycomb segments to each other decreases in at least a part of the joining layer in a direction from the inflow end surface side toward the outflow end surface side, a length L2 of the joining layer in the axial direction is smaller than 95% of a length L1 of the honeycomb segment in the axial direction, and a region of the honeycomb segments 5 mm or more from the outflow end surface in the axial direction is not provided with the joining layers which join the side surfaces of the honeycomb segments to each other.

[2] The honeycomb filter according to the above [1], wherein an area of a cross section of the honeycomb segment which is perpendicular to the axial direction gradually increases from the inflow end surface toward the outflow end surface in at least a part of the honeycomb segment in the axial direction.

[3] The honeycomb filter according to the above [2], wherein an open area of a cross section of each of the cells which is perpendicular to the axial direction gradually increases from the inflow end surface toward the outflow end surface in at least a part of the cell in the axial direction.

[4] The honeycomb filter according to any one of the above [1] to [3], wherein a thickness of the joining layer in the inflow end surface is 120% or more of a thickness of the joining layer at the closest position to the outflow end surface in the axial direction.

[5] The honeycomb filter according to any one of the above [1] to [4], wherein the partition walls contain, as a main component, at least one selected from a group consisting of silicon carbide, silicon nitride, mullite, sialon, aluminum titanate, alumina, and cordierite.

Effect of the Invention

A honeycomb filter of the present invention is a honeycomb filter of a segment structure in which side surfaces of a plurality of honeycomb segments are partially joined to each other by a joining layer. In the honeycomb filter of the present invention, an area of an outflow end surface of each of the honeycomb segments is larger than an area of the inflow end surface of the honeycomb segment. Moreover, a shape of a cross section of this honeycomb segment which is vertical to an axial direction from the inflow end surface toward the outflow end surface of the honeycomb segment has a similarity in the axial direction. Furthermore, a thickness of each of the joining layers which join the side surfaces of the honeycomb segments to each other decreases in at least a part of the joining layer in a direction from an inflow end surface side toward an outflow end surface side of the honeycomb segment. Additionally, a length L2 of the joining layer in the axial direction is smaller than 95% of a length L1 of the honeycomb segment in the axial direction. Moreover, a region of 5 mm or more from the outflow end surface in the axial direction is not provided with the joining layers which join the side surfaces of the honeycomb segments to each other. That is, when the outflow end surface is regarded as a starting point, the region of 0 to 5 mm from the outflow end surface in the axial direction is not provided with at least the joining layers. Such a honeycomb filter of the present invention can suppress an increase of a pressure loss, and can suitably decrease a heat stress generated in the honeycomb filter, as compared with a conventional honeycomb filter of a segment structure.

More specifically, in the honeycomb filter of the present invention, the area of the outflow end surface of each honeycomb segment is larger than the area of the inflow end surface of the honeycomb segment. Therefore, the thickness of each joining layer on the outflow end surface side can be decreased while suitably joining the side surfaces of the honeycomb segments to each other by the joining layer on the inflow end surface side. With the result that the area of the outflow end surface of the honeycomb segment is increased and the thickness of the joining layer on the outflow end surface side is decreased, a gas flow rate on the outflow end surface side can be decreased. Therefore, the increase of the pressure loss can be suppressed as compared with the conventional honeycomb filter of the segment structure. Moreover, in the honeycomb filter of the present invention, the region of 5 mm or more from the outflow end surface in the axial direction is not provided with the joining layers which join the side surfaces of the honeycomb segments to each other. That is, in the honeycomb filter of the present invention, the honeycomb segments are not bound to each other by each joining layer in the outflow end surface where the generated heat stress is maximized. Therefore, the respective honeycomb segments can freely be deformed (e.g., thermally expanded) on the outflow end surface side, and the heat stress can suitably be decreased.

DETAILED DESCRIPTION OF THE INVENTION

Hereinafter, embodiments of the present invention will specifically be described with reference to the drawings. It should be understood that the present invention is not limited to the following embodiments and that suitable modifications, improvements and the like added to the following embodiments on the basis of ordinary knowledge of a person skilled in the art without departing from the gist of the present invention also fall in the gist of the present invention.

(1) Honeycomb Filter:

One embodiment of a honeycomb filter of the present invention is a honeycomb filter 100 shown in FIG. 1 to FIG. 5. As shown in FIG. 1 to FIG. 5, the honeycomb filter 100 of the present embodiment is the honeycomb filter 100 of a segment structure including a plurality of honeycomb segments 4, a plurality of plugging portions 5, and joining layers 7. The honeycomb filter 100 of the segment structure is a honeycomb filter in which the plurality of honeycomb segments 4 are joined by the joining layers 7.

Figure 1:
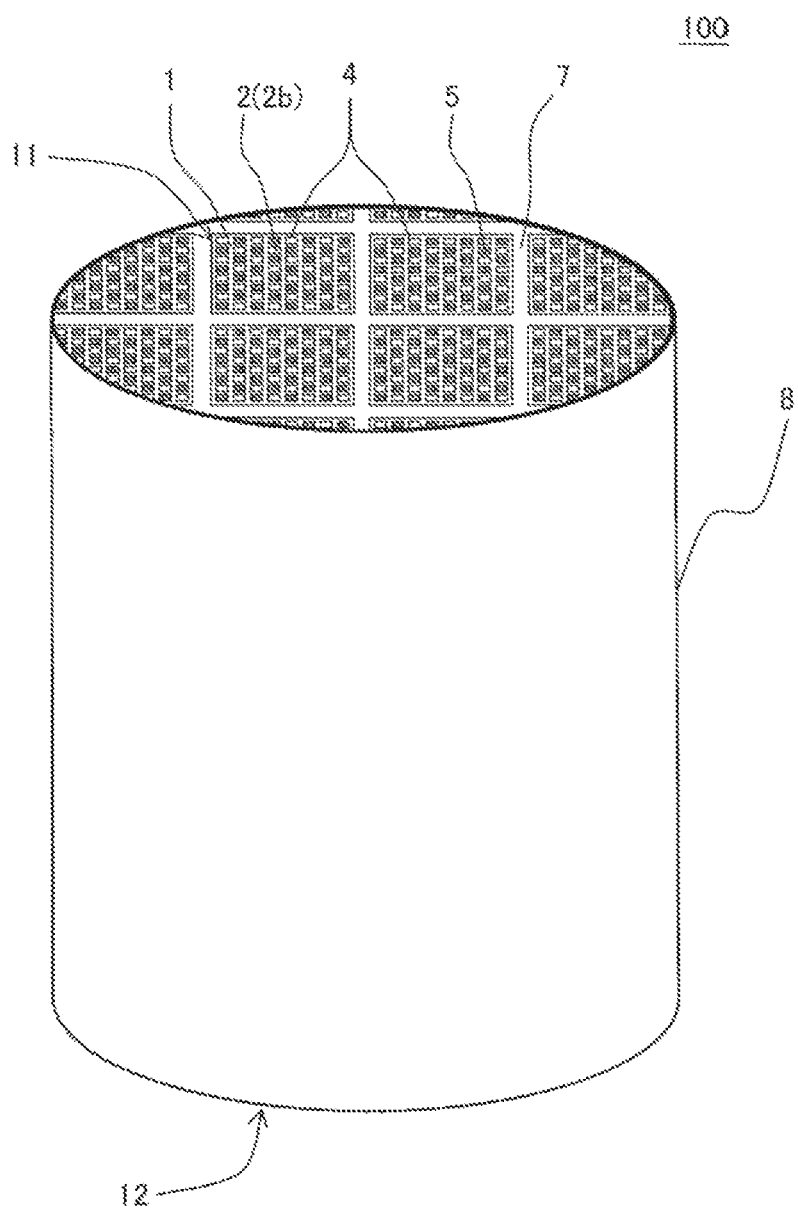
FIG. 1 is a perspective view schematically showing one embodiment of the honeycomb filter of the present invention, and showing that an inflow end surface of the filter faces upward.
Figure 2:
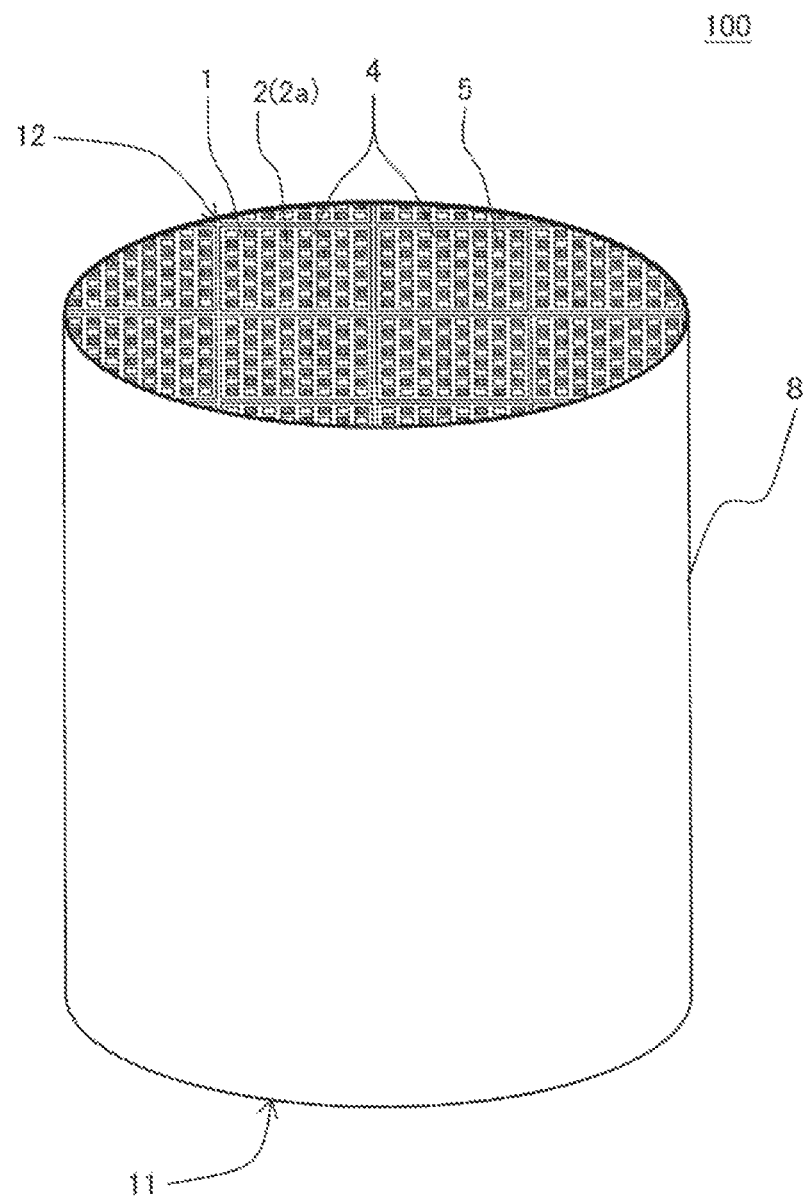
FIG. 2 is a perspective view schematically showing one embodiment of the honeycomb filter of the present invention, and showing that an outflow end surface of the filter faces upward.
Figure 3:
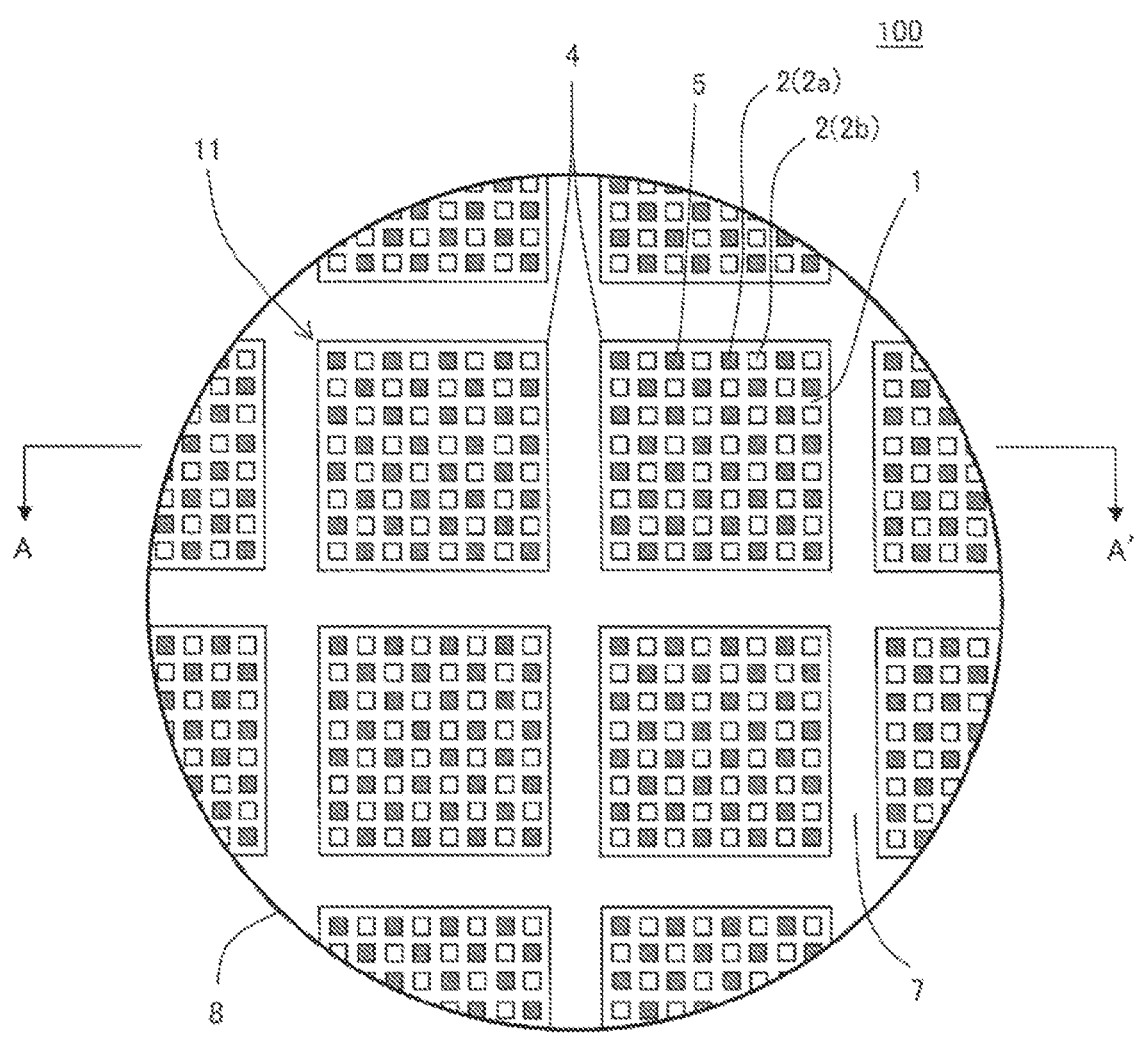
FIG. 3 is a plan view schematically showing an inflow end surface of one embodiment of the honeycomb filter of the present invention.
Figure 4:
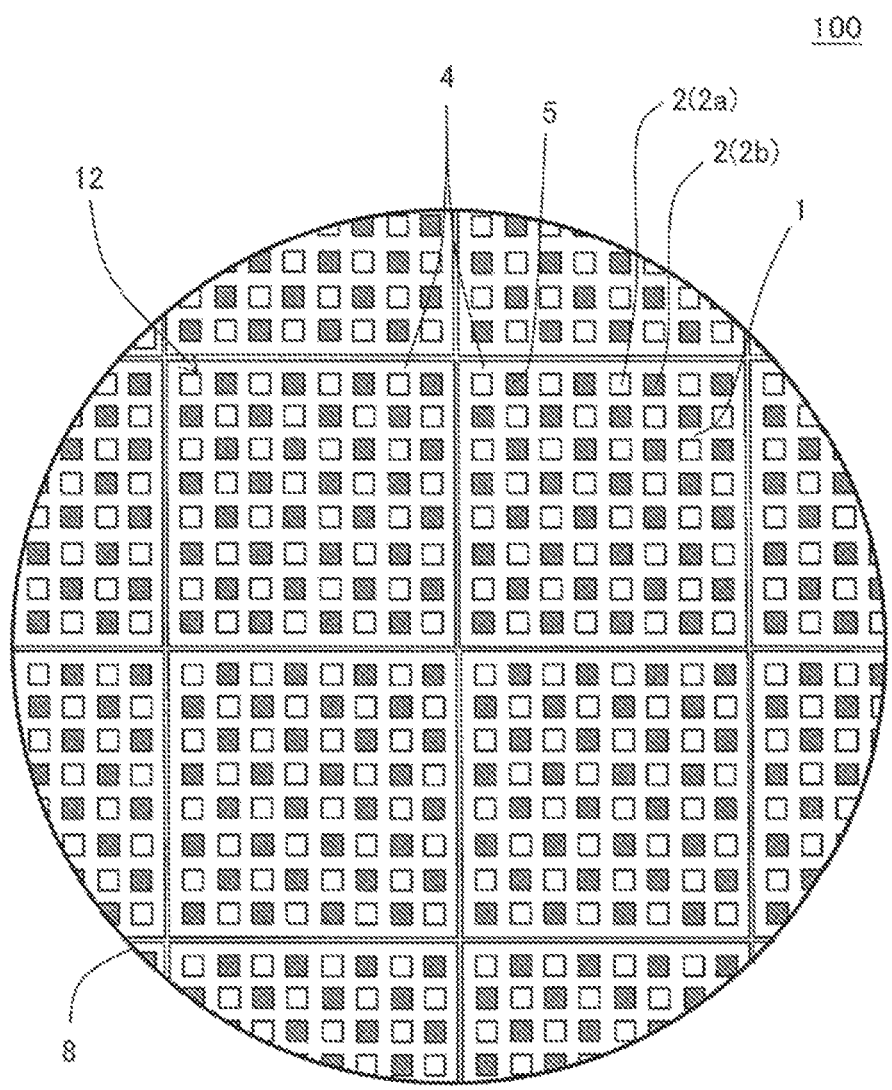
FIG. 4 is a plan view schematically showing an outflow end surface of one embodiment of the honeycomb filter of the present invention.
Figure 5:
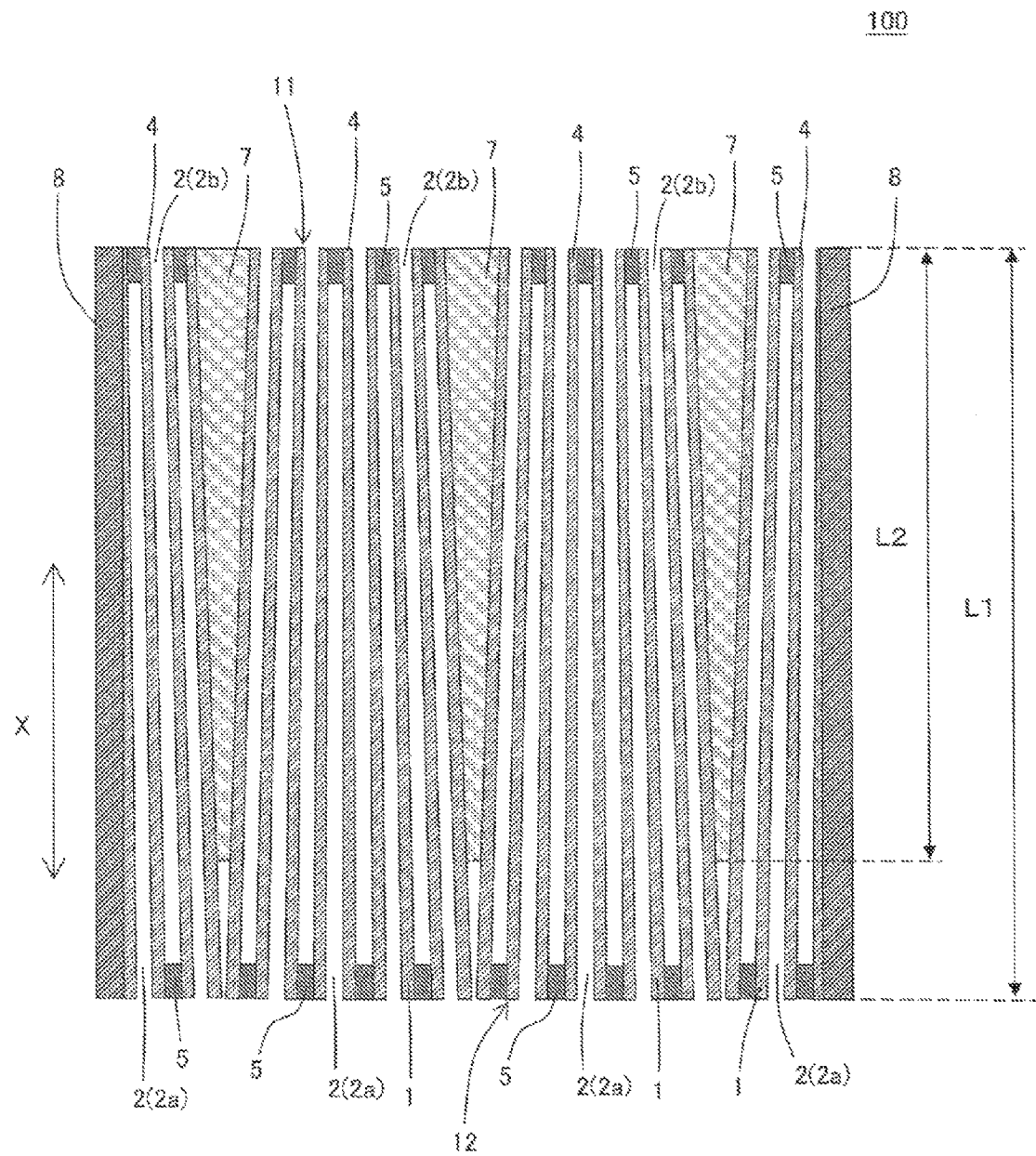
FIG. 5 is a cross sectional view schematically showing a section cut along the line A-A' of FIG. 3.

Here, FIG. 1 is a perspective view schematically showing this one embodiment of the honeycomb filter of the present invention, and showing that an inflow end surface of the filter faces upward. FIG. 2 is a perspective view schematically showing the one embodiment of the honeycomb filter of the present invention, and showing that an outflow end surface of the filter faces upward. FIG. 3 is a plan view schematically showing the inflow end surface of the one embodiment of the honeycomb filter of the present invention. FIG. 4 is a plan view schematically showing the outflow end surface of the one embodiment of the honeycomb filter of the present invention. FIG. 5 is a cross sectional view schematically showing a section cut along the line A-A' of FIG. 3.

Figure 6:
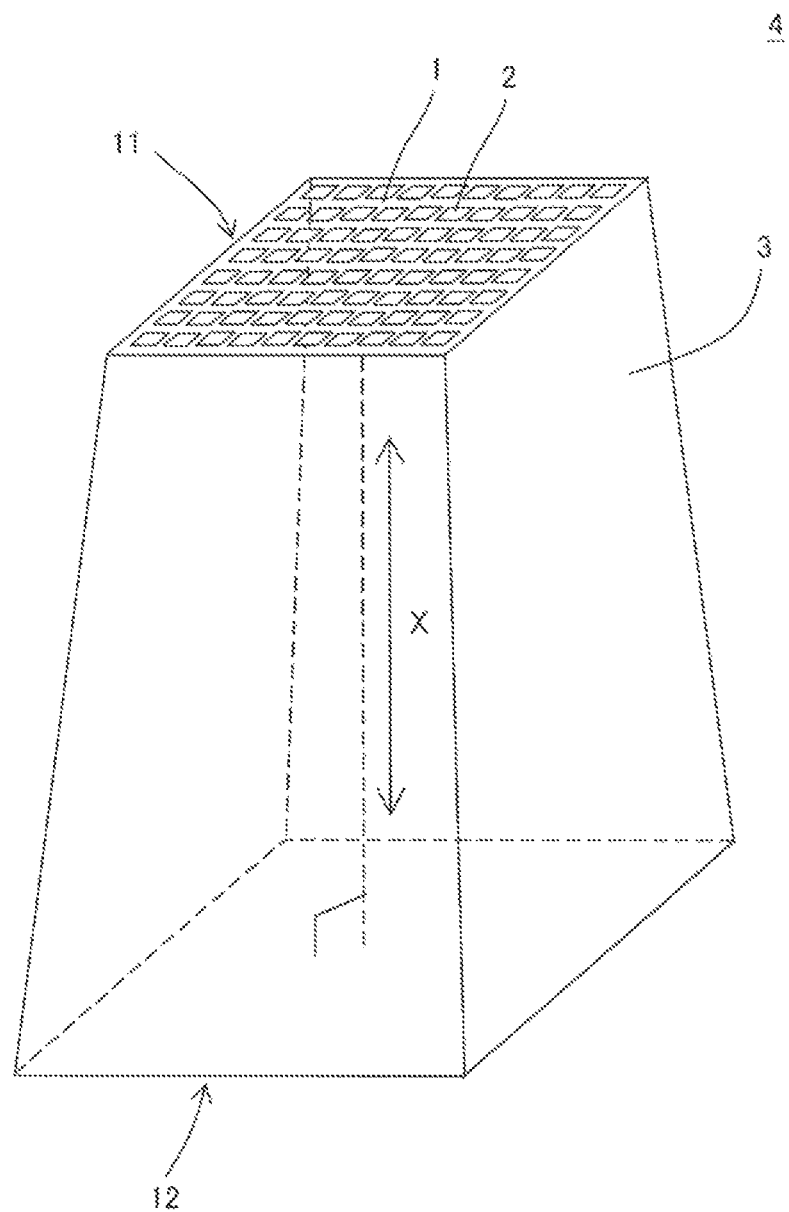
FIG. 6 is a perspective view schematically showing a honeycomb segment for use in one embodiment of the honeycomb filter of the present invention.

Each of the honeycomb segments 4 is a tubular segment having partition walls 1 with which a plurality of cells 2 extending from an inflow end surface 11 to an outflow end surface 12 are formed to become through channels of a fluid. As shown in FIG. 6, the honeycomb segment 4 may have an outer wall 3 positioned at the outermost periphery. FIG. 6 is a perspective view schematically showing the honeycomb segment for use in the one embodiment of the honeycomb filter of the present invention.

As shown in FIG. 1 to FIG. 5, the honeycomb filter 100 of the present embodiment includes the joining layers 7 which partially join the side surfaces of the plurality of honeycomb segments 4 to each other. In the honeycomb filter 100 shown in FIG. 1 to FIG. 5, 16 honeycomb segments 4 are joined by the joining layers 7. In the honeycomb filter 100 shown in FIG. 1 to FIG. 5, an outer periphery coating layer 8 is disposed to surround the honeycomb segments 4 joined by the joining layers 7.

In the honeycomb filter 100 of the present embodiment, ends of the cells 2 formed in the honeycomb segments 4 are plugged by plugging portions 5 on the side of the inflow end surface 11 or the outflow end surface 12. That is, among the cells 2 formed in the honeycomb segments 4, open frontal areas of first cells 2a on the side of the inflow end surface 11, and open frontal areas of second cells 2b other than the first cells 2a on the side of the outflow end surface 12 are plugged by plugging portions 5. "The first cells 2a" are obtained by arranging the plugging portions 5 in the open frontal areas of the cells 2 in the inflow end surface 11. "The second cells 2b" are obtained by arranging the plugging portions 5 in the open frontal areas of the cells 2 in the outflow end surface 12. In the honeycomb filter 100 of the present embodiment, a fluid such as an exhaust gas flows into the open frontal areas of the second cells 2b in the inflow end surface 11. On the other hand, a fluid such as the exhaust gas cannot directly flow into the first cells 2a, and the fluid which has flowed into the second cells 2b passes through the partition walls 1, flows into the first cells 2a, and is discharged from the open frontal areas of the first cells 2a in the outflow end surface 12. When the fluid moves from the second cells 2b to the first cells 2a, a particulate matter in the fluid is collected by the porous partition walls 1.

In the honeycomb filter 100 of the present embodiment, as shown in FIG. 6, an area of the outflow end surface 12 of the honeycomb segment 4 is larger than an area of the inflow end surface 11. The area of the inflow end surface 11 of the honeycomb segment 4 is the area of the inflow end surface 11 surrounded with the outer wall 3 positioned at the outermost periphery. Moreover, the area of the outflow end surface 12 of the honeycomb segment 4 is the area of the outflow end surface 12 surrounded with the outer wall 3 positioned at the outermost periphery. Furthermore, a shape of a cross sectional of the honeycomb segment 4 which is vertical to an axial direction X from the inflow end surface 11 toward the outflow end surface 12 of the honeycomb segment 4 has a similarity in the axial direction X. It is to be noted that an area of a cross section of the honeycomb segment 4 which is perpendicular to the axial direction X gradually increases from the inflow end surface 11 toward the outflow end surface 12 in at least a part of the honeycomb segment in the axial direction X. For example, in the honeycomb filter 100 of the present embodiment, the whole shape of the honeycomb segment 4 is preferably a frustum shape. The honeycomb segment 4 shown in FIG. 6 is an example where the whole shape of the honeycomb segment 4 is a quadrangular frustum shape. In the honeycomb filter 100 shown in FIG. 1 to FIG. 5, among the 16 honeycomb segments 4 joined by the joining layers 7, four honeycomb segments 4 arranged in a central portion have the quadrangular frustum shape. Moreover, among the 16 honeycomb segments 4 joined by the joining layers 7, outer peripheries of the 12 honeycomb segments 4 arranged in an outer peripheral portion are subjected to grind processing in accordance with the whole shape (a cylindrical shape) of the honeycomb filter 100. The outer peripheral portion of the honeycomb filter 100 is provided with the outer periphery coating layer 8 to surround the 16 honeycomb segments 4 joined by the joining layers 7.

Moreover, in the honeycomb filter 100 of the present embodiment, a thickness of each of the joining layers 7 which join the side surfaces of the honeycomb segments 4 to each other decreases in at least a part of the joining layer in the direction from the inflow end surface 11 side toward the outflow end surface 12 side, so that the thickness of the joining layer on the outflow end surface 12 side is smaller than the thickness of the joining layer on the inflow end surface 11 side. That is, as described above, the area of the outflow end surface 12 of the honeycomb segment 4 is larger than the area of the inflow end surface 11 of the honeycomb segment. Therefore, when the honeycomb segments 4 are arranged so that the outflow end surfaces 12 of the respective honeycomb segments are positioned on the same plane, a space between the side surfaces of the honeycomb segments 4 on the inflow end surface 11 side is larger than that on the outflow end surface 12 side. In other words, the space between the side surfaces of the honeycomb segments 4 on the outflow end surface 12 side is smaller than that on the inflow end surface 11 side. In the honeycomb filter 100 of the present embodiment, each of the joining layers 7 is disposed to fill in the space between the side surfaces of the plurality of honeycomb segments 4 arranged in this manner. Therefore, while suitably joining the side surfaces of the honeycomb segments 4 to each other on the inflow end surface 11 side by the joining layer 7, the thickness of the joining layer 7 on the outflow end surface 12 side can be decreased. The area of the outflow end surface 12 of the honeycomb segment 4 is increased and the thickness of the joining layer 7 on the outflow end surface 12 side is decreased, so that a gas flow rate on the outflow end surface 12 side can be decreased. Therefore, an increase of a pressure loss can be suppressed as compared with a conventional honeycomb filter of a segment structure.

In the honeycomb filter 100 of the present embodiment, a length L2 of the joining layer 7 in the axial direction X is smaller than 95% of a length L1 of the honeycomb segment 4 in the axial direction X from the inflow end surface 11 toward the outflow end surface 12. Moreover, in the honeycomb filter 100 of the present embodiment, a region of 5 mm or more from the outflow end surface 12 in the axial direction X is not provided with the joining layers 7 which join the side surfaces of the honeycomb segments 4 to each other. That is, when the outflow end surface 12 is regarded as a starting point, the region of 0 to 5 mm from the outflow end surface 12 in the axial direction X is not provided with at least the joining layers 7. Consequently, in the outflow end surface 12 of the honeycomb filter 100 of the present embodiment in which the largest heat stress is generated, the honeycomb segments 4 are not bound to each other by the joining layer 7. Therefore, the respective honeycomb segments 4 can freely be deformed (e.g., thermally expanded) on the outflow end surface 12 side, and the heat stress can suitably be decreased. "The axial direction X from the inflow end surface 11 toward the outflow end surface 12 of the honeycomb segment 4" is a direction crossing the outflow end surface 12 of the honeycomb segment 4 at right angles.

In consequence, the honeycomb filter 100 of the present embodiment can suppress the increase of the pressure loss, and suitably decrease the heat stress generated in the honeycomb filter 100, as compared with the conventional honeycomb filter of the segment structure.

In the honeycomb filter 100 of the present embodiment, the shape of the cross section of the honeycomb segment 4 which is vertical to the axial direction X has the similarity in the axial direction X. Hereinafter, "the shape of the cross section of the honeycomb segment 4 which is vertical to the axial direction X" will simply be referred to as "the cross sectional shape of the honeycomb segment 4" sometimes. When "the cross sectional shape of the honeycomb segment 4 has the similarity in the axial direction X", for example, the following constitution is meant. When the area of the cross sectional shape of the honeycomb segment 4 increases from the inflow end surface 11 toward the outflow end surface 12, a thickness of each of the partition walls 1 constituting the honeycomb segments 4 and a size of each of the cells defined by the partition walls 1 increase while maintaining a constant ratio. For example, in each of the honeycomb segments 4, a cell density of the honeycomb segment 4 in the axial direction X is constant. According to such a constitution, the gas flow rate on the outflow end surface 12 side can suitably be decreased, and the increase of the pressure loss of the honeycomb filter 100 can be suppressed. The cells 2 are further preferably formed in the honeycomb segments 4 so that an open area of a cross section of each of the cells 2 which is perpendicular to the axial direction X gradually increases from the inflow end surface 11 toward the outflow end surface 12 in at least a part of the cell in the axial direction X.

Moreover, in the honeycomb filter 100 of the present embodiment, a thickness of the joining layer 7 in the inflow end surface 11 is preferably 1200 or more of a thickness of the joining layer 7 at the closest position to the outflow end surface 12 in the axial direction X. According to such a constitution, the honeycomb segments 4 bound on the outflow end surface 12 side are sufficiently released, and hence the generation of the heat stress on the outflow end surface 12 side can more effectively be suppressed. Therefore, even when a high temperature gas is applied to the particulate matter deposited on the partition walls 1 of the honeycomb filter 100 and the particulate matter is forcibly burnt and removed to regenerate the honeycomb filter, damages such as cracks are not easily generated in the honeycomb filter 100.

There is not any special restriction on the whole shape of the honeycomb filter 100 of the present embodiment, but the shape is preferably a cylindrical shape, a tubular shape with elliptic or race track-like end surfaces, a square tubular shape with end surfaces having a polygonal shape such as "a square shape, a rectangular shape, a triangular shape, a pentangular shape, a hexagonal shape, or an octagonal shape", or the like. The whole shape of the honeycomb filter 100 is more preferably the cylindrical shape, or the tubular shape with the elliptic or race track-like end surfaces, from the viewpoints that an excessively small curvature radius is avoided and that stress concentration is avoided. The honeycomb filter 100 shown in FIG. 1 to FIG. 5 shows an example of the cylindrical shape. Moreover, the honeycomb filter 100 shown in FIG. 1 to FIG. 5 has the outer periphery coating layer 8. The outer periphery coating layer 8 is preferably formed by applying a ceramic material to an outer peripheral portion of a joined assembly obtained by joining the plurality of honeycomb segments 4 so that the side surfaces of the honeycomb segments are arranged to face each other.

Hereinafter, each constituent element of the honeycomb filter of the present embodiment will be described in more detail.

(1-1) Honeycomb Segment:

Each of the honeycomb segments 4 is a tubular segment having the partition walls 1 with which the plurality of cells 2 extending from the inflow end surface 11 to the outflow end surface 12 are formed to become the through channels of the fluid. In the honeycomb filter 100 of the present embodiment, the plurality of honeycomb segments 4 are joined by the joining layers 7. As shown in FIG. 1 to FIG. 5, the plurality of honeycomb segments 4 include the honeycomb segments 4 having the outer peripheral portions subjected to the grind processing in accordance with the whole shape (the cylindrical shape) of the honeycomb filter 100 sometimes. Hereinafter, among the honeycomb segments 4 joined by the joining layers 7, the honeycomb segments arranged in the central portion and each having an outer periphery which is not ground will be referred to as complete segments sometimes. Moreover, among the honeycomb segments 4 joined by the joining layers 7, the honeycomb segments arranged in the outer peripheral portion and each having the ground outer periphery will be referred to as incomplete segments sometimes. Hereinafter, in the description of the honeycomb segments, for example, the complete segments will be described unless otherwise noted. It is to be noted that the incomplete segment is obtained by grinding the outer periphery of the complete segment in accordance with the whole shape of the honeycomb filter 100. Therefore, the incomplete segment prior to the grind processing preferably has a constitution similar to the complete segment.

The area of the outflow end surface 12 of the honeycomb segment 4 is larger than the area of the inflow end surface 11 of the honeycomb segment. In the honeycomb filter 100 of the present embodiment, an area S2 of the outflow end surface 12 is from 1.02 to 1.06 times, further preferably from 1.03 to 1.05 times, and especially preferably from 1.04 to 1.05 times an area S1 of the inflow end surface 11. According to such a constitution, the increase of the pressure loss can be suppressed, and the heat stress generated in the honeycomb filter can suitably be decreased. When the area S2 of the outflow end surface 12 is smaller than 1.02 times the area S1 of the inflow end surface 11, a difference between the area S1 and the area S2 is excessively small, and an effect of suppressing the increase of the pressure loss is not easily compatible with an effect of decreasing the heat stress sometimes. In particular, the pressure loss increase suppressing effect is not easily obtained. Moreover, when the area S2 of the outflow end surface 12 is in excess of 1.06 times the area S1 of the inflow end surface 11, the difference between the area S1 and the area S2 is excessively large. Therefore, a ratio covered by the joining layers 7 increases, and the pressure loss increase suppressing effect cannot sufficiently be obtained sometimes.

Moreover, the area S1 of the inflow end surface of the honeycomb segment is preferably from 400 to 16000 mm$^2$, further preferably from 800 to 3000 mm$^2$, and especially preferably from 1000 to 2000 mm$^2$. In particular, when the inflow end surface of the honeycomb segment has a quadrangular shape, a length of one side of the inflow end surface of the honeycomb segment is preferably 30 mm or more and 50 mm or less. When the length of the one side of the inflow end surface is smaller than 30 mm, a relative thickness of the joining layer increases. The pressure loss increases in excess of the above-mentioned pressure loss increase suppressing effect. When the length of the one side of the inflow end surface is in excess of 50 mm, the maximum or minimum temperature difference in each honeycomb segment is excessively large, thereby generating the remarkably large heat stress in the honeycomb segment sometimes.

The shape of the honeycomb segment 4 varies with the complete segment and the incomplete segment. The shape of the complete segment is preferably a frustum shape in which a shape of a cross section perpendicular to the axial direction X is polygonal. It is to be noted that the shape of the honeycomb segment 4 is more preferably a quadrangular frustum shape with the above cross sectional shape being a square or rectangular shape, or a hexagonal frustum shape with the cross sectional shape being a hexagonal shape. On the other hand, the shape of the incomplete segment is a frustum shape in which a part of the shape of the cross section perpendicular to the axial direction X is a shape (e.g., a circular portion) corresponding to the outer peripheral shape of the honeycomb filter.

There is not any special restriction on a shape of the cells (an open shape in the cross section vertical to the axial direction X). Examples of the shape include a triangular shape, a quadrangular shape, a hexagonal shape, and an octagonal shape. In the case of the quadrangular shape, a square or rectangular shape is preferable, and the square shape is more preferable.

A thickness of each of the partition walls in the inflow end surface is preferably from 125 to 430 μm, further preferably from 150 to 360 μm, and especially preferably from 180 to 360 μm. When the thickness of the partition wall is smaller than 125 μm, a temperature of the honeycomb filter becomes excessively high at the burning and removing of deposited soot. Even when the above-mentioned heat stress decreasing effect is obtained, the partition walls might break due to the heat stress. When the thickness of the partition wall is larger than 430 μm, an initial pressure loss of the honeycomb filter increases sometimes. That is, the pressure loss excessively increases in excess of the above-mentioned pressure loss increase suppressing effect sometimes. In the honeycomb filter of the present embodiment, the cross sectional shape of the honeycomb segments preferably has the similarity in the axial direction X of this honeycomb segment as described above. Therefore, when the area of the cross sectional shape of the honeycomb segments increases from the inflow end surface toward the outflow end surface, the partition wall thickness and the size of each cell defined by the partition walls preferably increase while maintaining a constant ratio.

A porosity of the partition walls is preferably from 35 to 85%, further preferably from 38 to 70%, and especially preferably from 40 to 68%. When the porosity is smaller than 35%, the initial pressure loss of the honeycomb filter increases sometimes. When the porosity is larger than 85%, a strength of the honeycomb filter decreases sometimes. The porosity is a value measured by a mercury porosimeter. The partition walls of the honeycomb segments are preferably formed so that the plurality of honeycomb segments constituting the honeycomb filter have the same porosity.

An average pore diameter of the partition walls is preferably from 5 to 30 μm, further preferably from 7 to 25 μm, and especially preferably from 8 to 21 μm. When the average pore diameter is smaller than 5 μm, the initial pressure loss of the honeycomb filter increases sometimes. When the average pore diameter is larger than 30 μm, the strength of the honeycomb filter deteriorates sometimes. The average pore diameter is a value measured by the mercury porosimeter. The partition walls of the honeycomb segments are preferably formed so that the plurality of honeycomb segments constituting the honeycomb filter have the same average pore diameter.

There is not any special restriction on a cell density of the honeycomb segment, but the cell density is preferably from 15 to 70 cells/cm$^2$, and further preferably from 23 to 62 cells/cm$^2$. When the cell density is smaller than 15 cells/cm$^2$, the strength of the honeycomb filter deteriorates sometimes. When the cell density is larger than 70 cells/cm$^2$, a cross sectional area of each cell (the area of the cross section perpendicular to the axial direction X) decreases, and hence the pressure loss increases sometimes. The plurality of honeycomb segments are preferably formed so that the plurality of honeycomb segments constituting the honeycomb filter have the same cell density.

There is not any special restriction on the number of the honeycomb segments 4 constituting the honeycomb filter 100. For example, the honeycomb filter 100 shown in FIG. 1 to FIG. 5 include the 12 honeycomb segments 4. In the honeycomb filter 100, the four honeycomb segments 4 are the complete segments, and the complete segments are arranged in an arrangement of two transversal segments×two longitudinal segments in the cross section perpendicular to the axial direction X. Moreover, 12 honeycomb segments 4 positioned at the outer periphery of the four complete segments (the outer periphery of the cross section perpendicular to the axial direction X) are the incomplete segments.

There is not any special restriction on a material of the partition walls, when the porous partition walls can be formed by the material, but the material preferably contains, as a main component, at least one selected from the group consisting of silicon carbide, silicon nitride, mullite, sialon, aluminum titanate, alumina and cordierite. When the material containing the at least one selected from the above group as the main component is used, the partition walls having an excellent strength and heat resisting properties can be obtained. It is to be noted that "the main component" indicates that a content of the component is 50 mass % or more of the whole constituent material containing the main component.

There is not any special restriction on a length of each honeycomb segment from the inflow end surface to the outflow end surface, but the length is preferably from 50 to 500 mm, and further preferably from 100 to 400 mm. When the length of the honeycomb segment from the inflow end surface to the outflow end surface is excessively small, the heat stress decreasing effect does not sufficiently develop.

(1-2) Plugging Portion:

As shown in FIG. 1 to FIG. 5, the plugging portions 5 are arranged in the ends of the cells 2 formed in the honeycomb segments 4 on the inflow end surface 11 side or the outflow end surface 12 side, and each of the plugging portions plugs either end of the cell 2. The plugging portion 5 is disposed in the one end of each of the cells 2, so that the honeycomb segment 4 having the porous partition walls 1 serves as a filter to purify a fluid such as the exhaust gas.

There is not any special restriction on the arrangement of the plugging portions, when the plugging portion is disposed in the one end of each of the cells 2, and the honeycomb segment 4 can serve as the filter. That is, there is not any special restriction on the arrangement of the cells (the first cells) including the plugging portions arranged on the inflow end surface side and the cells (the second cells) including the plugging portions arranged on the outflow end surface side. However, from the viewpoint that the particulate matter in the fluid is suitably collected by the partition walls, the first cells and the second cells are preferably alternately arranged via the partition walls. It is to be noted that part of the first cells or part of the second cells may be concentrated in one portion of each of the end surfaces of the honeycomb segment.

There is not any special restriction on a material of the plugging portions, but a ceramic material is preferable, and the example of the preferable material of the partition walls can suitably be used.

(1-3) Joining Layer:

As shown in FIG. 1 to FIG. 5, the joining layers 7 partially join the side surfaces of the plurality of honeycomb segments 4 to each other. That is, the joining layer 7 is made of a joining material to integrally join the plurality of honeycomb segments 4.

In the honeycomb filter 100 of the present embodiment, the thickness of each of the joining layers 7 which join the side surfaces of the honeycomb segments 4 to each other decreases in at least a part of the joining layer in the direction from the inflow end surface 11 side toward the outflow end surface 12 side. As described above, the space between the side surfaces of the honeycomb segments 4 on the outflow end surface 12 side is smaller than that on the inflow end surface 11 side. The joining layer 7 is disposed to fill in the space between the side surfaces of the plurality of honeycomb segments 4 arranged in this manner, and hence the thickness of the joining layer 7 decreases in at least a part of the joining layer in the direction from the inflow end surface 11 side toward the outflow end surface 12 side.

The thickness of the joining layer 7 is actually suitably determined in accordance with the shape of the honeycomb segments 4, the arrangement of the plurality of honeycomb segments 4, and the size of the space between the honeycomb segments 4 in the outflow end surface 12. For example, when the plurality of honeycomb segments 4 are arranged so that there is not any space between the honeycomb segments in the outflow end surface 12, the thickness of the joining layer 7 is smallest. The size of the space between the side surfaces of the honeycomb segments 4 corresponds to the thickness of the joining layer 7. It is to be noted that in the honeycomb filter 100 of the present embodiment, the space between the plurality of honeycomb segments 4 in the outflow end surface 12 is preferably from 0 to 4 mm, further preferably from 0.1 to 3 mm, and especially preferably from 0.3 to 2 mm. When the space between the plurality of honeycomb segments 4 in the outflow end surface 12 is in excess of 4 mm, the thickness of the joining layer 7 is excessively large, so that the initial pressure loss of the honeycomb filter increases sometimes.

Moreover, in the honeycomb filter 100 of the present embodiment, the length L2 of the joining layer 7 in the axial direction X is smaller than 95% of the length L1 of the honeycomb segment 4 in the axial direction X from the inflow end surface 11 toward the outflow end surface 12. That is, a length of a portion which is not provided with the joining layers 7 is 5% or more of the length L1 of the honeycomb segment 4. The length of the portion which is not provided with the joining layers 7 is preferably from 5 to 30%, further preferably from 5 to 20%, and especially preferably from 5 to 15% of the length L1 of the honeycomb segment 4. When the length L2 of the joining layer 7 is 95% or more of the length L1 of the honeycomb segment 4 (i.e., the length of the portion which is not provided with the joining layer 7 is smaller than 5), it is difficult to decrease the heat stress at the generation of the large heat stress on the outflow end surface 12 side. Moreover, when the length L2 of the joining layer 7 is smaller than 70%, the length of the joining layer 7 excessively decreases, so that a joining force to join the honeycomb segments 4 to each other cannot sufficiently be obtained sometimes.

Furthermore, in the honeycomb filter 100 of the present embodiment, the region of 5 mm or more from the outflow end surface 12 in the axial direction X is not provided with the joining layers 7 which join the side surfaces of the honeycomb segments 4 to each other. A length of the region which is not provided with the joining layers 7 from the outflow end surface 12 is preferably from 5 to 30 mm, further preferably from 10 to 20 mm, and especially preferably from 10 to 15 mm from the outflow end surface 12. When a region having a length smaller than 5 mm from the outflow end surface 12 is provided with the joining layers 7, it is difficult to decrease the heat stress at the generation of the large heat stress on the outflow end surface 12 side. It is to be noted that when the region which is not provided with the joining layers 7 is excessively large, the joining force to join the honeycomb segments 4 to each other cannot sufficiently be obtained sometimes.

Moreover, the joining layers 7 are preferably arranged up to the inflow end surface 11 of the honeycomb segment 4. That is, the joining layers 7 on the inflow end surface 11 side are preferably arranged up to the same position as the inflow end surface 11 of the honeycomb segment 4 in the axial direction X.

There is not any special restriction on a material of the joining layers, but an example of the material is preferably a material obtained by bonding ceramic particles of silicon carbide, alumina, silicon nitride or the like by colloidal silica or colloidal alumina. By use of such a material, the heat stress generated in the honeycomb filter can suitably be decreased. Moreover, by use of the material, the joining layers serve as a buffer material when a load is applied to the honeycomb filter.

Moreover, a thermal expansion coefficient of each joining layer is preferably $2.0 \times 10^{-6}$/K or more and $4.0 \times 10^{-6}$/K or less. Furthermore, a Young's modulus of the joining layer is preferably 0.01 GPa or less. The thermal expansion coefficient is a thermal expansion coefficient of the joining layer at 40° C. to 800° C.

(2) Manufacturing Method of Honeycomb Filter:

Next, a method of manufacturing a honeycomb filter of the present embodiment will be described. First, a green body for preparing the honeycomb segments is prepared, and this green body is formed to prepare a plurality of formed honeycomb segment bodies (a forming step). The formed honeycomb segment bodies are preferably formed so that an area of an outflow end surface of each body is larger than an area of an inflow end surface of the body. The obtained formed honeycomb segment bodies are preferably dried to obtain the dried honeycomb segment bodies.

Next, the obtained formed honeycomb segment bodies (or the dried honeycomb segment bodies after the drying performed as required) are fired to prepare the honeycomb segments (a honeycomb segment preparing step).

Next, a plugging material is filled into open frontal areas of the predetermined cells (the first cells) in the inflow end surface of each obtained honeycomb segment and open frontal areas of the remaining cells (the second cells) in the outflow end surface of the honeycomb segment, to form plugging portions (a plugging step).

Next, the respective obtained honeycomb segments are joined by the joining material, to prepare a joined honeycomb segment assembly (the honeycomb filter) as shown in FIG. 1 to FIG. 5 (a honeycomb segment joining step). That is, the plurality of honeycomb segments are arranged adjacent to each other so that the side surfaces of the segments face each other, and the facing side surfaces are joined to each other by the joining material to prepare the joined honeycomb segment assembly (the honeycomb filter). The number of the honeycomb segments to be joined is preferably the number in accordance with a size of the honeycomb filter to be prepared. A length of the joining material is smaller than 95% of the length L1 of the honeycomb segment in the axial direction from the inflow end surface toward the outflow end surface. Moreover, the region of 5 mm or more from the outflow end surface in the axial direction is not provided with the joining material. The joining material performs a function of buffering (absorbing) a volume change at thermal expansion or thermal contraction of the honeycomb segments, and a function of joining the respective honeycomb segments. This joining material becomes the joining layer in the honeycomb filter of the present embodiment.

Moreover, after forming the joined assembly, an outer peripheral portion of the joined assembly is preferably cut and formed into a desirable shape. When the honeycomb filter of the present embodiment is manufactured, the outer peripheral portion of the joined assembly is preferably cut so that the honeycomb segments positioned at the outermost periphery are cut and so that a shape of the cross section vertical to the axial direction is a round shape, an elliptic shape, or a rack track shape.

Furthermore, after forming the joined assembly or after cutting the outer peripheral portion of the joined assembly to obtain the desirable shape, an outer periphery coating treatment is preferably performed to dispose an outer periphery coating layer at the outermost periphery of the joined assembly, to obtain the honeycomb filter.

In consequence, the honeycomb filter of the present embodiment can be manufactured. Hereinafter, the respective manufacturing steps will be described in more detail.

(2-1) Forming Step:

First, in the forming step, a ceramic forming raw material containing a ceramic raw material is formed, to form the plurality of formed honeycomb segment bodies in which a plurality of cells are formed to become through channels of a fluid.

The ceramic raw material contained in the ceramic forming raw material preferably contains at least one selected from the group consisting of silicon carbide, silicon nitride, mullite, sialon, aluminum titanate, alumina, a cordierite forming raw material, and cordierite. It is to be noted that the cordierite forming raw material is the ceramic raw material blended so as to have a chemical composition in which silica falls in a range of 42 to 56 mass %, alumina falls in a range of 30 to 45 mass % and magnesia falls in a range of 12 to 16 mass %, and the material is fired to become cordierite.

Moreover, this ceramic forming raw material is preferably prepared by mixing the above ceramic raw material with a dispersion medium, an organic binder, an inorganic binder, a pore former, a surfactant and the like. There is not any special restriction on the composition ratio of each raw material, and the composition ratio is preferably determined in accordance with a structure, a material and the like of the honeycomb segments to be prepared.

To form the ceramic forming raw material, first, it is preferable that the forming raw material is kneaded to obtain a green body, and the obtained green body is formed into a honeycomb shape. There is not any special restriction on a method of kneading the forming raw material to form the green body, and an example of the method is a method using a kneader, a vacuum clay kneader or the like. There is not any special restriction on a method of extruding the green body to obtain the formed honeycomb body, and a heretofore known forming method such as extrusion forming or injection forming can be used. An example of the method is preferably a method of extruding the material by using a die having a desirable cell shape, partition wall thickness and cell density to obtain the formed honeycomb segment body. A material of the die is preferably a hard metal which does not easily wear down.

An example of a method of preparing the formed honeycomb segment body in which the area of the outflow end surface is larger than the area of the inflow end surface is as follows. When the formed honeycomb segment body is prepared by the extrusion forming by use of the above-mentioned die, an extrusion speed at the formation is changed during the extrusion. When the extrusion speed is changed, the formed honeycomb segment body can be obtained in which the area of the outflow end surface is larger than the area of the inflow end surface. In particular, a change ratio of the extrusion speed between the start and the end of the extrusion of the honeycomb segment body is preferably 20% or more. According to such a method, it is possible to obtain the formed honeycomb segment body in which the shape of the cross section vertical to the axial direction from the inflow end surface toward the outflow end surface has the similarity in the axial direction.

After preparing the above-mentioned formed honeycomb segment body, the obtained formed honeycomb segment body may be dried. There is not any special restriction on a drying method, but examples of the drying method include hot air drying, microwave drying, dielectric drying, reduced-pressure drying, vacuum drying, and freeze-drying. Above all, the dielectric drying, the microwave drying, the hot air drying or any combination of these methods is preferably performed.

(2-2) Honeycomb Segment Preparing Step:

Next, the obtained formed honeycomb segment bodies are preferably fired to obtain the honeycomb segments. The firing of each formed honeycomb segment body may be performed after arranging the plugging portions in the formed honeycomb segment body. Moreover, in this honeycomb segment preparing step, the formed honeycomb segment body can be deformed so that the area of the outflow end surface is larger than the area of the inflow end surface. For example, at the firing, the formed honeycomb segment body is disposed in a vertically upright position so that the outflow end surface faces downward, and the inflow end surface faces upward. In consequence, the formed honeycomb segment body is deformed so that a dimension in the vicinity of the outflow end surface of the formed honeycomb segment body to which a weight is applied is larger than the dimension of the inflow end surface.

Moreover, prior to the firing (the final firing) of the formed honeycomb segment body, the formed honeycomb segment body is preferably calcinated. The calcinating is performed for degreasing. There is not any special restriction on a calcinating method, as long as organic substances (the organic binder, a dispersant, the pore former, etc.) in the formed body can be removed. In general, a burning temperature of the organic binder is from about 100 to 300° C., and a burning temperature of the pore former is from about 200 to 800° C. Therefore, as calcinating conditions, heating is preferably performed in an oxidation atmosphere at about 200 to 1000° C. for about three to 100 hours.

The firing (the final firing) of the formed honeycomb segment body is performed so as to sinter and densify the forming raw material constituting the calcinated formed body, thereby acquiring a predetermined strength. Firing conditions (temperature, time, and atmosphere) vary in accordance with the type of the forming raw material, and hence suitable conditions may be selected in accordance with the type of the raw material. For example, when the cordierite forming raw material is used, the firing temperature is preferably from 1410 to 1440° C. Moreover, the firing time is preferably from four to six hours, as time to keep the highest temperature.

(2-3) Plugging Step:

Next, the plugging material is filled into the open frontal areas of the first cells on the inflow end surface side and the open frontal areas of the second cells on the outflow end surface side of each honeycomb segment, to form the plugging portions.

When the plugging material is filled into the honeycomb segment, the plugging material is first filled into the predetermined cells (e.g., the first cells) from one end surface (e.g., the inflow end surface) side of the honeycomb segment. Afterward, the plugging material is filled into the remaining cells (e.g., the second cells) from the other end surface (e.g., the outflow end surface) side. An example of a method of filling the plugging material is preferably a method having a masking step and a press-in step as follows. The masking step is a step of attaching a sheet to the one end surface (e.g., the inflow end surface) of the honeycomb segment, and making holes in portions of the sheet which overlap with "cells to be provided with the plugging portions". The press-in step is a step of pressing "an end of the honeycomb segment to which the sheet has been attached" into a container which contains the plugging material, and pressing the plugging material into the cells of the honeycomb segment. When the plugging material is pressed into the cells of the honeycomb segment, the plugging material passes through the holes made in the sheet, and is filled into the only cells that communicate with the holes made in the sheet. A method of filling the plugging material into the cells from the other end surface (e.g., the outflow end surface) of the honeycomb segment is preferably similar to the method of filling the plugging material into the cells from the one end surface of the honeycomb segment. Moreover, the plugging material may simultaneously be filled into the cells from both the end surfaces of the honeycomb segment.

Next, the plugging material filled into the cells of the honeycomb segments is preferably dried, to form the plugging portions, thereby obtaining the plugged honeycomb segments. Moreover, for the purpose of more securely fixing the plugging material, the plugging material may be fired after the drying. Furthermore, the plugging material may be filled into each formed honeycomb segment body before or after the drying, and the plugging material may be fired together with the formed honeycomb segment body before or after the drying.

(2-4) Honeycomb Segment Joining Step:

Next, the respective obtained honeycomb segments are joined by the joining material, to prepare the joined honeycomb segment assembly in which the plurality of honeycomb segments 4 are arranged adjacent to each other so that the side surfaces of the honeycomb segments face each other, and the facing side surfaces are joined to each other by the joining layer.

The honeycomb segments are preferably joined by using the joining material. There is not any special restriction on a method of applying the joining material to the side surfaces of the honeycomb segments, and a method such as brush application can be used.

An example of the joining material is a slurry obtained by adding additives such as an organic binder, resin balloon and dispersant to inorganic raw materials such as an inorganic fiber, colloidal silica, clay and SiC particles, further adding water, and kneading these materials.

The joining material to join the side surfaces of the honeycomb segments to each other forms the joining layers in a honeycomb structure to be prepared. The joining material is applied so that the length L2 of the joining material in the axial direction is smaller than 95% of the length L1 of each honeycomb segment in the axial direction from the inflow end surface toward the outflow end surface. Moreover, the joining material is not applied to the region of the honeycomb segment which is 5 mm or more from the outflow end surface.

After joining the plurality of honeycomb segments by the joining material, the outer peripheral portion of the obtained joined honeycomb segment assembly is preferably cut and formed into the desirable shape. Moreover, after joining the honeycomb segments and cutting the outer peripheral portion of the joined honeycomb segment assembly, an outer periphery coating material is preferably disposed in the outer peripheral portion, to prepare the honeycomb filter. This outer periphery coating material forms the outer periphery coating layer of the honeycomb filter. With the result that such an outer periphery coating layer is disposed, circularity and the like of the honeycomb filter can be enhanced.

According to such a constitution, the honeycomb filter of the present embodiment can be manufactured. However, the manufacturing method of the honeycomb filter of the present embodiment is not limited to the above-mentioned manufacturing method.

EXAMPLES

Hereinafter, the honeycomb structure of the present invention will further specifically be described with respect to examples, but the present invention is not limited to these examples.

Example 1

A ceramic raw material obtained by mixing silicon carbide (SiC) powder and metal silicon (Si) powder at a mass ratio of 80:20 was used. Then, hydroxypropyl methylcellulose as a binder and a water-absorbing resin as a pore former were added to this ceramic raw material, and water was also added, to prepare a forming raw material. The obtained forming raw material was kneaded by using a kneader, to obtain a green body.

Next, the obtained green body was formed by using a vacuum extrusion forming machine, and a plurality of formed honeycomb segment bodies having a plurality of cells defined by partition walls were prepared. In Example 1, during the extrusion forming, an extrusion speed was changed so that the extrusion speed at the end of formation was 120% of the extrusion speed at the start of formation. In consequence, it was possible to obtain the formed honeycomb segment bodies in which an area of each outflow end surface was larger than an area of each inflow end surface.

Next, the obtained formed honeycomb segment bodies were dried by high frequency dielectric heating, and then dried at 120° C. for two hours by use of a hot air drier. At the drying, the formed honeycomb segment bodies were arranged vertically so that the outflow end surfaces of the formed honeycomb segment bodies faced downward, and then dried.

Plugging portions were formed in the dried formed honeycomb segment bodies. First, open frontal areas of cells of the formed honeycomb segment bodies on the inflow end surface side were masked. At this time, the masked cells and the cells which were not masked were alternately arranged. Then, a masked end of each formed honeycomb segment body was immersed into a plugging slurry, to fill the plugging slurry into the open frontal areas of the cells which were not masked. Then, the plugging portions were similarly formed in the remaining cells of each dried formed honeycomb segment body in the outflow end surface (i.e., the cells which were not provided with the plugging portions in the inflow end surface).

Then, the formed honeycomb segment bodies provided with the plugging portions were degreased and fired, to obtain honeycomb segments in which the plugging portions were arranged in the open frontal areas of the cells. Degreasing conditions were at 550° C. and for three hours. Firing conditions were at 1450° C. and for two hours in an argon atmosphere. At the firing, the formed honeycomb segment bodies were arranged vertically so that the outflow end surfaces of the formed honeycomb segment bodies faced downward, and then fired.

In each of the obtained honeycomb segments, a partition wall thickness was 200 and a cell density was 62 cells/cm². Moreover, the honeycomb segment had a quadrangular frustum shape in which the area of the outflow end surface was larger than the area of the inflow end surface. The honeycomb segment of Example 1 had a quadrangular shape in which a length of one side of the inflow end surface was 34.5 mm and a length of one side of the outflow end surface was 35.0 mm. In Table 1, "partition wall thickness", "cell density", "material" and "segment size" of the honeycomb segment of Example 1 are shown. As described above, the honeycomb segments were made of the ceramic raw material using the silicon carbide (SiC) powder and the metal silicon (Si) powder, therefore "material" of the honeycomb segments is described as "Si—SiC." "Si—SiC" is a silicon-silicon carbide composite material.

The 16 honeycomb segments were prepared. Then, the 16 honeycomb segments were arranged in an arrangement of 4 segments×4 segments in a cross section vertical to an axial direction from the inflow end surface toward the outflow end surface of each honeycomb segment, and joined by a joining material, and the joining material was dried, to obtain a joined honeycomb segment assembly. The dried joining material became a joining layer. The joining material was applied to side surfaces of each honeycomb segment so that a thickness of a joining layer on the inflow end surface side was 1.2 mm, and a thickness of the joining layer on the outflow end surface side was 1.0 mm. Moreover, the joining material was not applied to a region of 10 mm from the outflow end surface, and any joining layers were not arranged in the region.

In Table 2, "length of non-joining portion from outflow end surface", "thickness of joining layer on inflow end surface side" and "thickness of joining layer on outflow end surface side" are shown. "Length of non-joining portion from outflow end surface" is a length of a portion where the joining material is not applied to the side surfaces of the honeycomb segments and any joining layers are not arranged. Moreover, "percentage of A/B" is shown in Table 2, in which "A" is the thickness of the joining layer on the inflow end surface side, and "B" is the thickness of the joining layer on the outflow end surface side.

TABLE 1

| | Honeycomb segment | | | | | | |
|---|---|---|---|---|---|---|---|
| | | | | Segment size | | Honeycomb filter | |
| | | | | Length of one | Length of one | | |
| | Partition wall thickness (μm) | Cell density (cells/cm²) | Material | side of inflow end surface (mm) | side of outflow end surface (mm) | Dia. (mm) | Length (mm) |
| Example 1 | 200 | 62 | Si—SiC | 34.5 | 35.0 | 144 | 152 |
| Example 2 | 200 | 62 | Si—SiC | 34.0 | 35.0 | 144 | 152 |
| Example 3 | 200 | 62 | Si—SiC | 33.0 | 35.0 | 144 | 152 |
| Comparative Example 1 | 200 | 62 | Si—SiC | 35.0 | 35.0 | 144 | 152 |
| Comparative Example 2 | 200 | 62 | Si—SiC | 34.7 | 35.0 | 144 | 152 |

TABLE 2

| | Joining layer | | | | Evaluation result | |
|---|---|---|---|---|---|---|
| | Length of non-joining portion from outflow end surface (mm) | Thickness of joining layer on inflow end surface side (A) (mm) | Thickness of joining layer on outflow end surface side (B) (mm) | Percentage of A/B (%) | Ratio of pressure loss (%) | Max. amount of deposited soot (g/L) |
| Example 1 | 10 | 1.2 | 1 | 120 | 96 | 8.5 |
| Example 2 | 10 | 1.2 | 0.6 | 200 | 95 | 8.5 |
| Example 3 | 10 | 1.2 | 0.3 | 400 | 93 | 8.5 |
| Comparative Example 1 | 0 | 1.2 | 1 | 120 | 100 | 7 |
| Comparative Example 2 | 0 | 1.2 | 1.05 | 114 | 99 | 7 |

Next, an outer periphery of the joined honeycomb segment assembly was subjected to grind processing so that the whole shape was a cylindrical shape. Afterward, a ceramic material was applied to the outer periphery of the ground joined honeycomb segment assembly, to form an outer periphery coating layer. In this way, a honeycomb filter of Example 1 was prepared. A shape of a cross section of the honeycomb filter which was vertical to the axial direction was a round shape having a diameter of 144 mm. Moreover, a length of the honeycomb filter in the axial direction was 152 mm. "Diameter" and "length" of the honeycomb filter are shown in Table 1.

As to the obtained honeycomb filter, "ratio of pressure loss" and "maximum amount of deposited soot" were obtained by the following method. The results are shown in Table 2.

[Ratio of Pressure Loss]

As to the ratio of the pressure loss, pressure losses of honeycomb filters of examples and comparative examples were measured. Specifically, air at 200° C. was allowed to flow into each honeycomb filter at a constant flow rate, pressures in the inflow end surface and outflow end surface of the honeycomb filter were measured, respectively, and a differential pressure was the pressure loss. Then, in each of Examples 1 to 3 and Comparative Example 2, the ratio of the pressure loss was obtained on the basis of the pressure loss of the honeycomb filter of Comparative Example 1. Specifically, the ratio of the pressure loss of the honeycomb filter of each of Examples 1 to 3 and Comparative Example 2 was obtained, when the pressure loss of the honeycomb filter of Comparative Example 1 was 100%. Moreover, in each of Examples 4 to 8 and Comparative Example 4, the ratio (percentage) of the pressure loss was obtained on the basis of the pressure loss of the honeycomb filter of Comparative Example 3. Furthermore, in each of Examples 9 to 11 and Comparative Example 6, the ratio of the pressure loss was obtained on the basis of the pressure loss of the honeycomb filter of Comparative Example 5. Also in each of Examples 4 to 11 and Comparative Examples 4 and 6, the ratio of the pressure loss was a ratio (percentage) of the pressure loss of the honeycomb filter of each of the examples and comparative examples, when the pressure loss of the honeycomb filter as a reference was 100%.

[Maximum Amount of Deposited Soot]

An exhaust gas including soot as a particulate matter was purified by using the honeycomb filter of each of the examples and comparative examples. To regenerate the honeycomb filter, the soot deposited on the partition walls of the honeycomb filter was burnt. The amount of the deposited soot was successively increased, to confirm a limit amount of the deposited soot in which cracks were generated in the honeycomb filter.

Examples 2 and 3

Honeycomb segments were prepared so that a length of one side of an inflow end surface of each honeycomb segment and a length of one side of an outflow end surface of the honeycomb segment indicated values shown in Table 1. A green body for producing each formed honeycomb segment body was prepared by a method similar to Example 1. In Example 2, during extrusion forming, an extrusion speed at the formation was changed so that the extrusion speed at the end was 125% of the extrusion speed at the start. Also in Example 3, during extrusion forming, an extrusion speed at the formation was changed so that the extrusion speed at the end was 130% of the extrusion speed at the start.

The procedures of Example 1 were repeated except that by use of each obtained honeycomb segment, "length of non-joining portion from outflow end surface", "thickness of joining layer on inflow end surface side" and "thickness of joining layer on outflow end surface side" were changed to values shown in Table 2, to prepare honeycomb filters of Examples 2 and 3. As to each obtained honeycomb filter, "ratio of pressure loss" and "maximum amount of deposited soot" were obtained by methods similar to those used in Example 1. The results are shown in Table 2.

Comparative Examples 1 and 2

Honeycomb segments were prepared so that a length of one side of an inflow end surface of each honeycomb segment and a length of one side of an outflow end surface of the honeycomb segment indicated values shown in Table 1. A green body for producing each formed honeycomb segment body was prepared by a method similar to Example 1. In Comparative Example 1, during extrusion forming, an extrusion speed was constant from the start to the end. Moreover, in Comparative Example 2, during extrusion forming, an extrusion speed at the formation was changed so that the extrusion speed at the end was 115% of the extrusion speed at the start.

The procedures of Example 1 were repeated except that by use of each obtained honeycomb segment, "length of non-joining portion from outflow end surface", "thickness of joining layer on inflow end surface side" and "thickness of joining layer on outflow end surface side" were changed to values shown in Table 2, to prepare honeycomb filters of Comparative Examples 1 and 2. As to each obtained honeycomb filter, "ratio of pressure loss" and "maximum amount of deposited soot" were obtained by methods similar to those used in Example 1. The results are shown in Table 2.

Examples 4 to 8

Honeycomb segments were prepared so that a partition wall thickness, a cell density, a length of one side of an inflow end surface and a length of one side of an outflow end surface of each honeycomb segment indicated values shown in Table 3. A green body for preparing each formed honeycomb segment body was prepared by a method similar to Example 1. In Example 4, during extrusion forming, an extrusion speed at the formation was changed so that the extrusion speed at the end was 120% of the extrusion speed at the start. In Example 5, during extrusion forming, an extrusion speed at the formation was changed so that the extrusion speed at the end was 125% of the extrusion speed at the start. Moreover, in Examples 6 to 8, during extrusion forming, an extrusion speed at the formation was changed so that the extrusion speed at the end was 130% of the extrusion speed at the start.

The procedures of Example 1 were repeated except that by use of each obtained honeycomb segment, "length of non-joining portion from outflow end surface", "thickness of joining layer on inflow end surface side" and "thickness of joining layer on outflow end surface side" were changed to values shown in Table 4, to prepare honeycomb filters of Examples 4 to 8. As to each obtained honeycomb filter, "ratio of pressure loss" and "maximum amount of deposited soot" were obtained by methods similar to those used in Example 1. The results are shown in Table 4.

TABLE 3

| | Honeycomb segment | | | | | Honeycomb filter | |
|---|---|---|---|---|---|---|---|
| | | | | Segment size | | | |
| | | | | Length of one | Length of one | | |
| | Partition wall thickness (μm) | Cell density (cells/cm²) | Material | side of inflow end surface (mm) | side of outflow end surface (mm) | Dia. (mm) | Length (mm) |
| Example 4 | 300 | 46 | Si—SiC | 34.5 | 35.0 | 144 | 152 |
| Example 5 | 300 | 46 | Si—SiC | 34.0 | 35.0 | 144 | 152 |
| Example 6 | 300 | 46 | Si—SiC | 33.0 | 35.0 | 144 | 152 |
| Example 7 | 300 | 46 | Si—SiC | 33.0 | 35.0 | 144 | 152 |
| Example 8 | 300 | 46 | Si—SiC | 33.0 | 35.0 | 144 | 152 |
| Comparative Example 3 | 300 | 46 | Si—SiC | 35.0 | 35.0 | 144 | 152 |
| Comparative Example 4 | 300 | 46 | Si—SiC | 34.7 | 35.0 | 144 | 152 |

TABLE 4

| | Joining layer | | | | Evaluation result | |
|---|---|---|---|---|---|---|
| | Length of non-joining portion from outflow end surface (mm) | Thickness of joining layer on inflow end surface side (A) (mm) | Thickness of joining layer on outflow end surface side (B) (mm) | Percentage of A/B (%) | Ratio of pressure loss (%) | Max. amount of deposited soot (g/L) |
| Example 4 | 10 | 1.2 | 1 | 120 | 95 | 9.5 |
| Example 5 | 10 | 1.2 | 0.6 | 200 | 94 | 9.5 |
| Example 6 | 10 | 1.2 | 0.3 | 400 | 92 | 9.5 |
| Example 7 | 5 | 1.2 | 0.3 | 400 | 92 | 9.5 |
| Example 8 | 20 | 1.2 | 0.3 | 400 | 92 | 9.5 |
| Comparative Example 3 | 0 | 1.2 | 1 | 120 | 100 | 8 |
| Comparative Example 4 | 0 | 1.2 | 1.05 | 114 | 99 | 8 |

Comparative Examples 3 and 4

Honeycomb segments were prepared so that a partition wall thickness, a cell density, a length of one side of an inflow end surface and a length of one side of an outflow end surface of each honeycomb segment indicated values shown in Table 3. A green body for producing each formed honeycomb segment body was prepared by a method similar to Example 1. In Comparative Example 3, during extrusion forming, an extrusion speed was constant from the start to the end. Moreover, in Comparative Example 4, during extrusion forming, an extrusion speed at the formation was changed so that the extrusion speed at the end was 115% of the extrusion speed at the start.

The procedures of Example 1 were repeated except that by use of each obtained honeycomb segment, "length of non-joining portion from outflow end surface", "thickness of joining layer on inflow end surface side" and "thickness of joining layer on outflow end surface side" were changed to values shown in Table 4, to prepare honeycomb filters of Comparative Examples 3 and 4. As to each obtained honeycomb filter, "ratio of pressure loss" and "maximum amount of deposited soot" were obtained by methods similar to those used in Example 1. The results are shown in Table 4.

Examples 9 to 11

Honeycomb segments were prepared so that a partition wall thickness, a cell density, a length of one side of an inflow end surface and a length of one side of an outflow end surface of each honeycomb segment indicated values shown in Table 5. A green body for preparing each formed honeycomb segment body was prepared by a method similar to Example 1. In Example 9, during extrusion forming, an extrusion speed at the formation was changed so that the extrusion speed at the end was 120% of the extrusion speed at the start. In Example 10, during extrusion forming, an extrusion speed at the formation was changed so that the extrusion speed at the end was 125% of the extrusion speed at the start. Also, in Example 11, during extrusion forming, an extrusion speed at the formation was changed so that the extrusion speed at the end was 130% of the extrusion speed at the start.

The procedures of Example 1 were repeated except that by use of each obtained honeycomb segment, "length of non-joining portion from outflow end surface", "thickness of joining layer on inflow end surface side" and "thickness of joining layer on outflow end surface side" were changed to values shown in Table 6, to prepare honeycomb filters of Examples 9 to 11. As to each obtained honeycomb filter, "ratio of pressure loss" and "maximum amount of deposited soot" were obtained by methods similar to those used in Example 1. The results are shown in Table 6.

TABLE 5

| | Honeycomb segment | | | | | | |
|---|---|---|---|---|---|---|---|
| | | | | Segment size | | Honeycomb filter | |
| | | | | Length of one | Length of one | | |
| | Partition wall thickness (μm) | Cell density (cells/cm$^2$) | Material | side of inflow end surface (mm) | side of outflow end surface (mm) | Dia. (mm) | Length (mm) |
| Example 9 | 430 | 31 | Si—SiC | 34.5 | 35.0 | 144 | 152 |
| Example 10 | 430 | 31 | Si—SiC | 34.0 | 35.0 | 144 | 152 |
| Example 11 | 430 | 31 | Si—SiC | 33.0 | 35.0 | 144 | 152 |
| Comparative Example 5 | 430 | 31 | Si—SiC | 35.0 | 35.0 | 144 | 152 |
| Comparative Example 6 | 430 | 31 | Si—SiC | 34.7 | 35.0 | 144 | 152 |

TABLE 6

| | Joining layer | | | | Evaluation result | |
|---|---|---|---|---|---|---|
| | Length of non-joining portion from outflow end surface (mm) | Thickness of joining layer on inflow end surface side (A) (mm) | Thickness of joining layer on outflow end surface side (B) (mm) | Percentage of A/B (%) | Ratio of pressure loss (%) | Max. amount of deposited soot (g/L) |
| Example 9 | 10 | 1.2 | 1 | 120 | 96 | 9.5 |
| Example 10 | 10 | 1.2 | 0.6 | 200 | 95 | 9.5 |
| Example 11 | 10 | 1.2 | 0.3 | 400 | 93 | 9.5 |
| Comparative Example 5 | 0 | 1.2 | 1 | 120 | 100 | 8 |
| Comparative Example 6 | 0 | 1.2 | 1.05 | 114 | 99 | 8 |

Comparative Examples 5 and 6

Honeycomb segments were prepared so that a partition wall thickness, a cell density, a length of one side of an inflow end surface and a length of one side of an outflow end surface of each honeycomb segment indicated values shown in Table 5. A green body for preparing each formed honeycomb segment body was prepared by a method similar to Example 1. In Comparative Example 5, during extrusion forming, an extrusion speed was constant from the start to the end. Moreover, in Comparative Example 6, during extrusion forming, an extrusion speed at the formation was changed so that the extrusion speed at the end was 115%, of the extrusion speed at the start.

The procedures of Example 1 were repeated except that by use of each obtained honeycomb segment, "length of non-joining portion from outflow end surface", "thickness of joining layer on inflow end surface side" and "thickness of joining layer on outflow end surface side" were changed to values shown in Table 6, to prepare honeycomb filters of Comparative Examples 5 and 6.

As to each obtained honeycomb filter, "ratio of pressure loss" and "maximum amount of deposited soot" were obtained by a methods similar to those used in Example 1. The results are shown in Table 6.

CONCLUSION

As shown in Table 1 to Table 6, honeycomb filters of Examples 1 to 11 had a lower pressure loss than honeycomb filters of Comparative Examples 1, 3 and 5 as references. Moreover, the honeycomb filters of Examples 1 to 11 indicated a large value of a maximum amount of deposited soot, as compared with the honeycomb filter having the same partition wall thickness and cell density. That is, the honeycomb filters of Examples 1 to 11 can suppress an increase of the pressure loss, and can suitably decrease a heat stress generated in each honeycomb filter, as compared with a conventional honeycomb filter of a segment structure.

INDUSTRIAL APPLICABILITY

A honeycomb filter of the present invention can suitably be utilized as a filter to purify gases discharged from an internal combustion engine such as a diesel engine, various burning devices and the like.

DESCRIPTION OF REFERENCE SIGNS

1: partition wall, 2: cell, 2a: first cell, 2b: second cell, 3: outer wall, 4: honeycomb segment, 5: plugging portion, 7: joining layer, 8: outer periphery coating layer, 11: inflow end surface, 12: outflow end surface, 100: honeycomb filter, L1: length of honeycomb segment in axial direction from inflow end surface toward outflow end surface, L2: length of joining layer in axial direction, and X: axial direction.

What is claimed is:
1. A honeycomb filter comprising:
   a plurality of honeycomb segments having partition walls with which a plurality of cells extending from an inflow end surface to an outflow end surface are formed to become through channels of a fluid;
   a plurality of plugging portions to plug openings of first cells on an inflow end surface side among the cells formed in the honeycomb segments, and openings of second cells other than the first cells on an outflow end surface side; and joining layers which partially join side surfaces of the plurality of honeycomb segments to each other, wherein an area of the outflow end surface of each of the honeycomb segments is larger than an area of the inflow end surface of the honeycomb segment, a shape of a cross section of the honeycomb segment which is vertical to an axial direction from the inflow end surface toward the outflow end surface has a similarity in the axial direction, a thickness of each of the joining layers which join the side surfaces of the honeycomb segments to each other decreases in at least a part of the joining layer in a direction from the inflow end surface side toward the outflow end surface side, a length L2 of the joining layer in the axial direction is smaller than 95% of a length L1 of the honeycomb segment in the axial direction, and a region of the honeycomb segments 5 mm or more from the outflow end surface in the axial direction is not provided with the joining layers which join the side surfaces of the honeycomb segments to each other, wherein the joining layers are formed entirely up to the inflow end surface of the honeycomb segments.

2. The honeycomb filter according to claim 1, wherein an area of a cross section of the honeycomb segment which is perpendicular to the axial direction gradually increases from the inflow end surface toward the outflow end surface in at least a part of the honeycomb segment in the axial direction.

3. The honeycomb filter according to claim 2, wherein an open area of a cross section of each of the cells which is perpendicular to the axial direction gradually increases from the inflow end surface toward the outflow end surface in at least a part of the cell in the axial direction.

4. The honeycomb filter according to claim 1, wherein a thickness of the joining layer in the inflow end surface is 120% or more of a thickness of the joining layer at the closest position to the outflow end surface in the axial direction.

5. The honeycomb filter according to claim 2, wherein a thickness of the joining layer in the inflow end surface is 120% or more of a thickness of the joining layer at the closest position to the outflow end surface in the axial direction.

6. The honeycomb filter according to claim 3, wherein a thickness of the joining layer in the inflow end surface is 120% or more of a thickness of the joining layer at the closest position to the outflow end surface in the axial direction.

7. The honeycomb filter according to claim 1, wherein the partition walls contain, as a main component, at least one selected from a group consisting of silicon carbide, silicon nitride, mullite, sialon, aluminum titanate, alumina, and cordierite.

8. The honeycomb filter according to claim 2, wherein the partition walls contain, as a main component, at least one selected from a group consisting of silicon carbide, silicon nitride, mullite, sialon, aluminum titanate, alumina, and cordierite.

9. The honeycomb filter according to claim 3, wherein the partition walls contain, as a main component, at least one selected from a group consisting of silicon carbide, silicon nitride, mullite, sialon, aluminum titanate, alumina, and cordierite.

10. The honeycomb filter according to claim 4, wherein the partition walls contain, as a main component, at least one selected from a group consisting of silicon carbide, silicon nitride, mullite, sialon, aluminum titanate, alumina, and cordierite.

11. The honeycomb filter according to claim 5, wherein the partition walls contain, as a main component, at least one selected from a group consisting of silicon carbide, silicon nitride, mullite, sialon, aluminum titanate, alumina, and cordierite.

12. The honeycomb filter according to claim 6, wherein the partition walls contain, as a main component, at least one selected from a group consisting of silicon carbide, silicon nitride, mullite, sialon, aluminum titanate, alumina, and cordierite.

13. The honeycomb filter according to claim 1, wherein the honeycomb segments and the joining layers are arranged such that there is a space between the honeycomb segments at the outflow end surface.

* * * * *